United States Patent [19]

Jezl et al.

[11] 4,129,701
[45] Dec. 12, 1978

[54] HORIZONTAL REACTOR FOR THE VAPOR PHASE POLYMERIZATION OF MONOMERS

[75] Inventors: James L. Jezl, St. Charles; Edwin F. Peters, Winfield, both of Ill.

[73] Assignee: Standard Oil Company (Indiana), Chicago, Ill.

[21] Appl. No.: 642,583

[22] Filed: Dec. 19, 1975

Related U.S. Application Data

[63] Continuation of Ser. No. 533,020, Dec. 16, 1974, abandoned.

[51] Int. Cl.² ............... C08F 10/00; C08F 12/08; C08F 14/06; C08F 36/06
[52] U.S. Cl. .................................... 526/65; 526/68; 526/70; 526/73; 526/352
[58] Field of Search .................. 526/65, 68, 70, 73

[56] References Cited

U.S. PATENT DOCUMENTS

| | | | |
|---|---|---|---|
| 2,292,897 | 8/1942 | Nielsen | 259/4 |
| 2,502,953 | 4/1950 | Jahnig | 196/52 |
| 2,797,908 | 7/1957 | Zubrzycki | 263/21 |
| 2,936,303 | 5/1960 | Gains | 260/93.7 |
| 3,023,203 | 2/1962 | Dye | 260/94.9 |
| 3,049,527 | 8/1962 | Powelson | 260/93.7 |
| 3,078,261 | 2/1963 | Wisseroth et al. | 260/92.1 |
| 3,245,762 | 4/1966 | Ullrich et al. | 23/285 |
| 3,254,070 | 5/1966 | Roelen | 260/94.9 |
| 3,256,263 | 6/1966 | Wisseroth et al. | 260/94.9 |
| 3,300,457 | 1/1967 | Schmid et al. | 260/88.2 |
| 3,338,986 | 8/1967 | Leibson et al. | 260/878 |
| 3,368,875 | 2/1968 | Tulleners | 23/288 |
| 3,469,948 | 9/1969 | Anderson et al. | 23/285 |
| 3,514,501 | 5/1970 | Leibson et al. | 260/878 |
| 3,522,227 | 7/1970 | Thomas | 260/92.8 |
| 3,625,932 | 12/1971 | Green | 260/92.8 |
| 3,652,527 | 3/1972 | Trieschmann et al. | 260/93.7 |
| 3,770,714 | 11/1973 | Dorschner et al. | 260/93.7 |
| 3,927,983 | 12/1975 | Gordon et al. | 23/260 |
| 3,957,448 | 5/1976 | Shepard et al. | 526/65 |
| 3,965,083 | 6/1976 | Jezl et al. | 526/65 |
| 3,970,611 | 7/1976 | Jezl et al. | 526/65 |
| 3,971,768 | 7/1976 | Peters et al. | 526/68 |

FOREIGN PATENT DOCUMENTS 103390 1/1974 German Democratic Rep.
1354020 5/1974 United Kingdom.

*Primary Examiner*—Alan Holler
*Attorney, Agent, or Firm*—William Magidson; Arthur G. Gilkes; William T. McClain

[57] ABSTRACT

Apparatus and process is herein disclosed by which a polymerizable monomer or mixture thereof can be economically and efficiently converted to polymeric substances with a high yield catalyst and, optionally, cocatalyst by a vapor phase, essentially isobaric, polymerization process using a horizontal, stirred-bed, quench-cooled, essentially total reactor off-gas recycle reactor.

12 Claims, 4 Drawing Figures

FIG. I

HORIZONTAL REACTOR FOR THE VAPOR PHASE POLYMERIZATION OF MONOMERS

This is a continuation, of application Ser. No. 533,020, filed Dec. 16, 1974, now abandoned.

SUMMARY OF THE INVENTION

This invention relates to novel apparatus and process for the vapor state polymerization of a polymerizable monomer or mixture thereof to produce normally solid polymeric substances and, more specifically, relates to apparatus for the polymerization of said monomer or mixture from the vapor state by an essentially isobaric process using a high yield catalyst and, optionally, cocatalyst, which apparatus is a horizontal, quench-cooled, stirred-bed reactor utilizing essentially total reactor off-gas recycle.

In accordance with the instant invention a reactor and process is disclosed which can economically and efficiently convert a polymerizable monomer or a mixture thereof to polymeric substances in a vapor phase, essentially isobaric polymerization process, which reactor is a stirred-bed, quench-cooled, horizontal reactor with essentially total reactor off-gas recycle capable of multiple temperature operation. The apparatus and process is characterized by a stirred agitation of the subfluidized polymer bed contained therein by transversely oriented paddles connected to a longitudinally oriented drive shaft typically located centrally in the reactor and is further characterized by segmentation of the reactor into polymerization sections separated one from another by suitable barriers such as weirs, such sections capable of being individually controlled with respect to polymer production rates and polymerization temperatures and, in one embodiment, partial pressures of the reactor gases as well.

BACKGROUND OF THE INVENTION

One of the problems in solution or slurry polymerization of monomers is the capital costs required in the production thereof. Monomer polymerization using a vapor phase process can be considerably more economical if certain problems inherent in vapor state polymerization can be solved. These include problems of carrying out the polymerization in a thermally controlled fashion so as to avoid hot spots, maintaining a proper product particle size distribution and, in the case where catalysts are utilized which have extremely high yields but are extremely sensitive to poisoning, decreasing to a minimum the amount of make-up material seen by the catalyst per amount of product formed. Another problem related to certain catalyst combinations is the narrow molecular weight distribution of the products formed with these catalysts. Now we have discovered a vapor phase reactor which largely or completely solves the above referred to problems and reaps important economic benefits through savings in energy consumption, raw materials and capital costs.

In U.S. Pat. No. 2,502,953 (Jahnig) a weired, downwardly oriented apparatus for contacting fluidized solid particles with gaseous fluids to purge or strip volatiles from such solids is taught.

In U.S. Pat. No. 2,936,303 (Goins) a vapor state polymerization of ethylene, propylene or mixtures thereof is carried out in a countercurrent, fluidized bed in the presence of inert diluent gas. In the process described therein catalyst in solid form is passed downwardly in the reactor and, for example, ethylene mixed with diluent gas is passed countercurrently up through a series of vertical fluidized bed reaction zones. In this process the reaction in the various reaction zones can be controlled independently by taking off-gas from the last reaction zone, cooling it, and recycling portions of such off-gases to each of the reaction zones. However, because of the use of diluent gas and a fluidized bed large quantities of gas must be passed through the reactor per unit of polymer produced.

In U.S. Pat. No. 3,023,203 (Dye) a suspended, gas phase polymerization of olefins using a reactor having three concentric superimposed vertical sections, comminuted catalyst addition suspended in the entering gas, and temperature regulation by gas cooling is shown. The process includes polymer removal without pressure letdown.

In U.S. Pat. No. 3,254,070 (Roelen) a method for the gas phase polymerization of ethylene using conventional cooling is described wherein a mixture of reaction products and solid or liquid catalysts is constantly being mechanically subdivided. This patent additionally teaches that the reacting material may be agitatingly moved through a number of stages each with different polymerization conditions. An additional mode described therein teaches that the first few stages may be carried out using liquid phase polymerization finishing up with polymerization in the vapor phase. Different polymerization temperatures may be used in the separate reactors.

In U.S. Pat. No. 3,256,263 (Wisseroth et al.) a method of removing heat and producing intensive movement of the polymeric product produced during the gas phase polymerization of olefins in a stirred, vertical, fluidized reactor is described using mechanical agitation and introduction of the polymerization monomer immediately after expansive cooling in the form of moving gas or liquid jets.

In U.S. Pat. No. 3,300,457 (Schmid et al.) polymerization of monoolefins, particularly ethylene and propylene, is accomplished in a fluidized bed using a stirred, vertical reactor. Catalysts and polymer in the reactor are moved in the direction of flow of the monoolefin by the stirring and heat is removed by cooling the walls of the vessel, by conduction using the gas stream, or by the introduction of liquefied monoolefin.

In U.S. Pat. No. 3,469,948 (Anderson et al.) a horizontal paddle type polymerization reactor using pulsed purge gases including the polymerizable olefin is described. The teaching of this patent is directed to the use of longitudinal paddles which are suitably shaped to give forward movement to the solid polymer resulting from the vapor phase polymerization.

In U.S. Pat. No. 3,652,527 (Trieschmann et al.) a process for the gas phase polymerization of propylene in a stirred-bed, vertical reactor using evaporative cooling of the reaction is described. This patent teaches that it is essential that one component of the catalyst combination must be directly placed on the bed of solid polymer produced in the polymerization and the second catalyst component must be introduced in the gas phase above the bed.

Finally, in British Pat. No. 1,354,020 (Badische) a vapor phase olefin polymerization process is described in which the heat generated in the polymerization process is removed by the introduction of the monomer and heat transfer agents in gaseous or liquid state in the polymerization zone. However, the use of multiple polymerization temperatures in the vertical, stirred, fluid-bed reactor is not taught and it is difficult to see how such individual control could be accomplished in the apparatus described.

SHORT DESCRIPTION OF THE DRAWING

STATEMENT OF THE INVENTION

Figure 1:
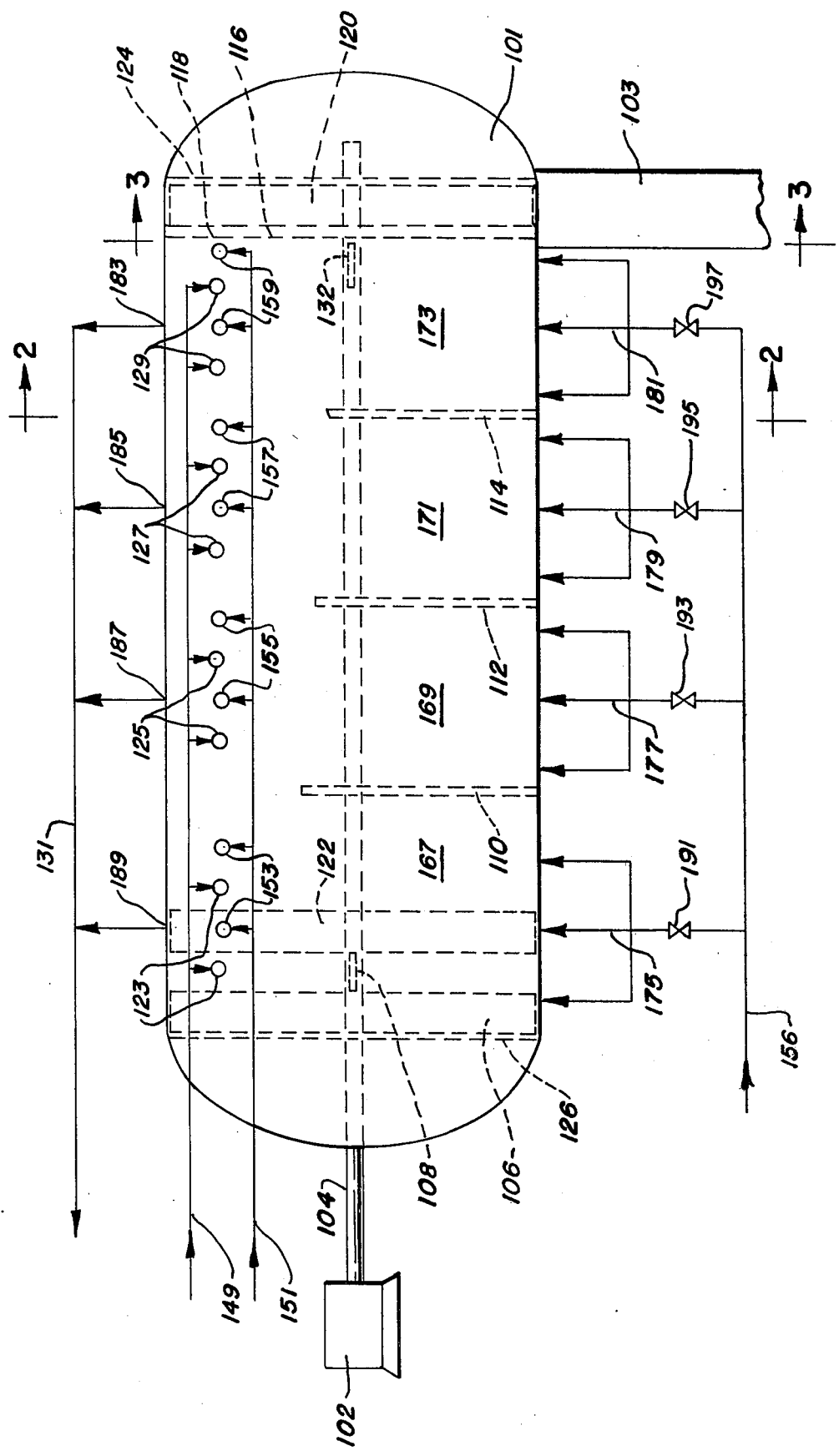
FIG. 1 shows a longitudinal view of one embodiment of the reactor described herein.

The description set forth herein includes subject matter which is disclosed and claimed in U.S. Pat. Nos. 3,965,083 and 3,971,768.

The invention described herein is a horizontal reactor for the essentially isobaric, vapor phase polymerization of polymerizable monomers utilizing essentially total reactor off-gas recycle and a quench-cooled, stirred-bed mode of operation. It is particularly adapted for use with polymerization catalysts which have a high enough polymerization yield that catalyst residues need not be removed from the polymeric product during the polymer finishing process. In general, the reactor utilizes a controlled introduction of catalyst components and quench liquid into its two or more polymerization sections directly onto and into the stirred, subfluidized bed of forming polymer and polymerization of monomer from the vapor phase in and over such bed. The polymer solid is continuously removed by passing through a take-off barrier generally at one end of the reactor into a take-off vessel. The reactor introduces monomer or a mixture thereof and, optionally, hydrogen largely or wholly underneath the polymer bed and quench liquid onto the surface of the bed. The reactor generally has two or more polymerization sections and the several sections are separated from each other by weirs or other suitably shaped barriers to prevent gross back-mixing between sections. Each section may be individually controlled in terms of polymerization temperature and polymer production rate so that a polymeric product having a controlled spread of molecular weight and particle size may more easily be produced.

Reactor off-gases are removed along the top of the reactor after removing entrained polymer fines as completely as possible from the off-gases. The reactor off-gases are then taken to a separation zone whereby the quench liquid is at least in part separated along with any further polymer fines and some of the catalyst components from polymerization monomer and hydrogen, if used, which monomer and hydrogen are then recycled to inlets spaced along the various polymerization sections of the reactor and located largely or wholly underneath the surface of the polymer bed. A portion of the quench liquid including the further polymer fines is taken off the separation zone and in major part returned to inlets spaced along the top of the reactor. A minor part of such quench liquid purified of polymer fines and catalyst components is fed into a catalyst make-up zone for catalyst diluent so that fresh quench liquid need not be introduced for that purpose. Provision may be made in the multiple section reactor to introduce the catalyst components and quench liquid at different rates into the different sections of the reactor to aid in individual control of the polymerization temperatures and polymer production rates of the various sections. Catalyst components may be added into or onto the stirred bed.

By the term vapor state reactor or process is meant a reactor or process, the monomer or monomers of which are vapors or gases under the conditions prevailing in the reactor.

The recycle system and reactor are so designed that they operate essentially isobarically. That is no more than the normal operating variations are present. Preferably, the reactor and recycle system pressure variations are no more than ± 25 psig and, more preferably, no more than ± 10 psig.

Figure 4:
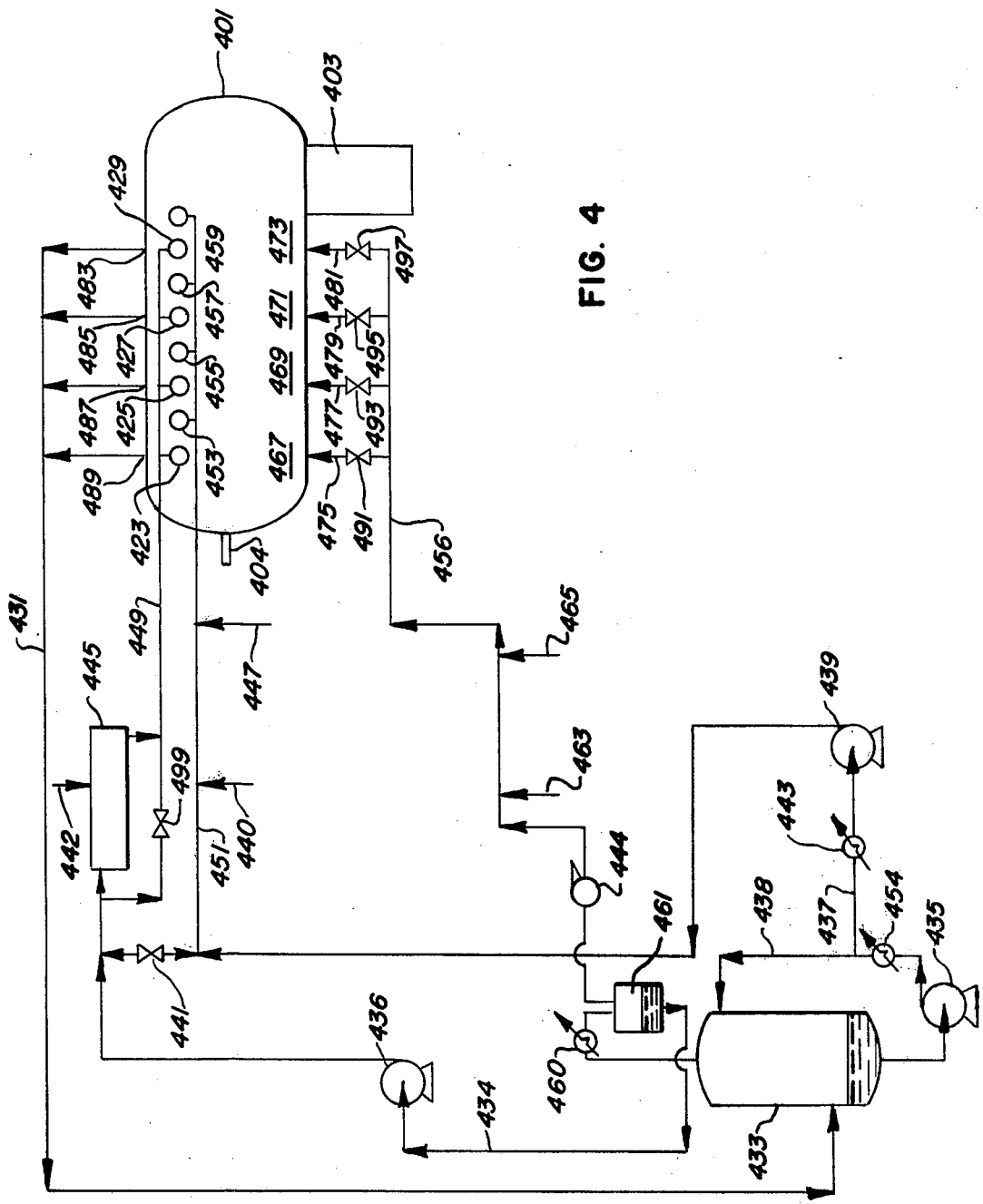
FIG. 4 shows one embodiment of an essentially isobaric process by which the reactor described herein is employed with essentially total reactor off-gas recycle.

One embodiment of a process using the reactor of this invention is shown in detail in FIG. 4 which Figure may be divided roughly into two areas, the reactor area and the reactor off-gas treatment (separation) and catalyst make-up area.

As may be seen by looking at FIG. 4 the reactor volume of horizontal polymerization reactor 401 is divided into several stirringly agitated sections 467, 469, 471 and 473 to provide for the possibility of operating the different sections of reactor at different temperatures and/or different polymer production rates. Polymerization takes place in each of the aforementioned sections to form a polymer bed distributed throughout the reactor and the polymerization temperature of each of the sections may be individually controlled by a combination of methods including the stirring agitation, the controlled differential introduction of vapor recycle into each of the sections through inlets 475, 477, 479 and 481 spaced along the bottom of the reactor, and the introduction into each of the sections of inert quench liquid and catalyst components at different rates through quench liquid inlets 453, 455, 457, and 459 and catalyst inlets 423, 425, 427 and 429 spaced along the top of the reactor.

Reactor off-gases are removed through outlets 483, 485, 487, and 489. Since a certain deleterious amount of polymer fines may be produced in the reactor they advantageously are substantially removed prior to transfer of the reactor off-gases to the reactor off-gas treatment and catalyst make-up area by using traps, filters, settlers, cyclones or scrubbers or a combination thereof.

Polymer solid is produced in each of the stirringly agitated sections 467 through 473 and, due to the continued production of such polymer, the amount of product constantly passes through the take-off barrier and out of the reactor into polymer take-off vessel 403.

Catalyst, dissolved or slurried in recycle quench liquid, is advantageously introduced onto the surface of the bed in at least one of the various polymerization reaction sections through inlets 423, 425, 427, and 429. Similarly placed inlets 453, 455, 457, and 459 are used to introduce the recycle quench liquid, which may contain cocatalyst, onto the bed in the individual reaction sections. However, depending on the nature of the catalyst, cocatalyst and monomer to be polymerized, catalyst and/or cocatalyst can be sprayed or otherwise introduced into the reactor neat or in other non-polymerizable vehicles. Alternatively, for some monomers, catalyst and cocatalyst can be added to make-up zone 445 and together added to reactor 401.

In one mode of operation it has been found advantageous to make the catalyst and quench liquid inlets concentric so that the catalyst and quench liquid are sprayed into the reactor and onto the surface of the polymer bed in such a way as to more evenly distribute the catalysts on the polymer bed surface. However, the catalyst and quench inlets may be made separate and the catalysts and quench liquid introduced separately onto the bed.

The reactor off-gases are taken via line 431 to scrubber tower 433 wherein at least part of the quench liquid component of the off-gases, further polymer fines and some of catalyst components are removed from the polymerizable monomer and hydrogen, if used. The polymerizable monomer and hydrogen together with some quench liquid vapor are returned to reactor 401 from the top of scrubber tower 433, after, advantageously, passing through heat exchanger 460 and separator 461 to condense out additional quench liquid, via blower 444 and vapor recycle line 456 with additional hydrogen and monomer make-up being added via lines 463 and 465. Alternatively, monomer and hydrogen can be returned from scrubber tower 433 to reactor 401 bypassing heat exchanger 460 and separator 461. The amount of vapor recycle introduced into the individual sections of the reactor via inlets 475, 477, 479, and 481 can be individually controlled by valves 491, 493, 495, and 497 and the bed thereby kept in a subfluidized state. The quench liquid of separator 461 is essentially free of polymer fines and catalyst components and suitable for use in catalyst make-up zone 445.

Quench liquid, separated from the reactor off-gases, is cooled by heat exchanger 454 and returned in major portion to the top of scrubber tower 433 via line 438. A minor portion of the quench liquid is returned through line 437, heat exchanger 443, pump 439 and quench liquid recycle line 451 to quench liquid inlets 453, 455, 457, and 459 carrying with it some monomer, hydrogen, cocatalyst and any polymer fines carried by the off-gases into scrubber tower 433. Quench liquid make-up may be added via line 440. In the important embodiment in which cocatalyst is used, make-up cocatalyst may be added to catalyst make-up zone 445, injected directly into the recycle quench liquid stream through line 447 or may be added directly in a non-polymerizable vehicle into reactor 401. A small portion of quench liquid essentially free of polymer fines and catalyst components is taken off separator 461 and passed through line 434 and pump 436 to catalyst make-up zone 445 for catalyst make-up purposes.

Polymerization in catalyst make-up zone 445 or associated line 449 and inlets 423–429 can cause serious plugging problems and may be controlled by keeping the cocatalyst concentration in catalyst make-up some 445 below a certain value, which value depends upon the identity of the catalyst and cocatalyst used and the monomer to be polymerized. Where make-up cocatalyst is added to catalyst make-up zone 445 provision may have to be made to prevent polymerization from occurring in associated lines by cooling the make-up zone, decreasing the residence time of the catalyst components therein, etc. Alternatively, make-up quench liquid from line 447 can be used in catalyst make-up zone 445 in place of recycle quench liquid to prevent polymerization of monomer in said zone.

Valve 499 has been provided in the catalyst make-up zone bypass line in order to more easily vary the concentration of catalyst in the catalyst make-up introduced into the reactor. It has been found that the particle size of the polymer produced in reactor 401 can be advantageously varied by varying the concentration of the catalyst being introduced through inlets 423, 425, 427 and 429. Further, it has been found advantageous to vary the catalyst concentration either by changing its concentration in make-up zone 445 or, additionally and alternatively, to change its concentration by introducing quench liquid into catalyst line 449 via valve 499 just prior to the point where the catalyst enters the catalyst inlets 423, 425, 427, and 429. Make-up catalyst is added through line 442.

The polymer solid which builds up in stirred reactor 401 traverses the length of reactor essentially because of polymer build-up in the reactor bed and not by the stirring agitation. This condition is insured by the paddle design used which provides for agitation but not for backward or forward movement of the bed. Polymer particles in the bed adjacent to the take-off barrier are swept by the stirring through the take-off barrier opening, which opening may be made variable in size and position by a number of devices for maintaining different levels of polymer solid in the reactor.

Weirs, if used, may be attached to drive shaft 404 with slip rings or fixed to the walls of the reactor and are beneficially oriented so that the top of the weir is roughly aligned with the bed orientation during agitation. This provides for spill-over along the entire length of the weir top. However, the weirs can be oriented horizontally, if desired. Other types of barriers may be used in place of the weirs to prevent gross back-mixing between the two or more sections of the reactor. For example, thin wall barriers attached to drive shaft 404 which fill the reactor cross-section and have one or more holes cut in them may be used as can be understood by one skilled in the art.

The polymer particles passing through such take-off barrier opening fall into polymer take-off vessel 403. The polymer solid taken off can be treated with additives and melt extruded in the ways conventional to the art or it can be taken off without substantial pressure letdown in such a way that the solid is melted in vessel 403 and the resulting molten polymer treated with kill substance and additives and devolatilized while still in the molten state and then finished into commercially sized product by conventional techniques.

FIG. 1 shows in detail reactor 401 of FIG. 4. It may be seen that the interior of reactor 101 is composed of four individually controllable polymerization sections 167 to 173 separated from one another by weirs 110 to 114, which weirs extend upwardly to somewhat over the middle of the reactor and are oriented so that their top surfaces line up approximately with the polymer bed surface during agitation. In a favored embodiment weirs 110, 112 and 114 are constructed in height so that the polymer bed fills about half the volume of the reactor. As the solid polymer exceeds the weir height it falls into the adjacent section moving in the direction of the take-off.

In a mode wherein it is desired to operate with two or more gas compositions (different hydrogen concentrations) as well as different section temperatures, all the section barriers are constructed as above except for the one or more dividing structures which divide the reactor into the compartments of different gas compositions. The dividing structures are thin wall barriers extending upwardly and filling the cross-section of the reactor and contain an opening situated beneath the level of the polymer bed for polymer solid movement. Gas intermixing between the compartments is thereby controlled. Operating in such a variable gas composition mode, the individual compartments should have separate reactor off-gas recycle treatments and returns and may have separate hydrogen and monomer make-ups.

Generally, the dividing structures are designed to prevent extensive intermixing of the vapors between the individual compartments, however in one mode of multiple hydrogen operation the vapors are deliberately mixed by feeding the vapors from the hydrogen poor compartment to the hydrogen rich compartment and adding make-up monomer primarily to the hydrogen poor compartment and hydrogen make-up primarily to the hydrogen rich compartment.

The interior of the reactor is equipped with a rotating paddle drive shaft 104 extending longitudinally through reactor 101 to which are attached paddles extending transversely from the shaft and making close clearance with the inside wall of reactor 101 to insure adequate bed mixing at the reactor wall. The paddles are preferably flat to maximize bed agitation for a given rotational speed and preferably two paddles per impellor are used. The width of the paddles is such that between about four and about twelve impellors (8 to 24 paddles) will be present in a reactor section of about three feet in length. The orientation of the paddles on adjacent impellors is about ninety degrees. The paddles are so constructed to minimize any forward or backward movement of the bed during stirring and are driven by meter 102 at such a speed as to give a slow and regular turnover of the entire polymer bed contained in the reactor. The speed at which the impellors turn should be fast enough to provide the desired heat and mass transfer between liquid, solid and gas but no so fast that the finer portions of the polymer bed are thrown up in large quantities into the space above the bed. That is, the speed typically is about five to about thirty RPM so that the integrity of the bed is maintained.

The space following the take-off barrier and above the take-off vessel is likewise equipped with one or more similar impellers, 120, the number of which depend upon the size of the take-off. However, take-off assemblies such as end or side take-off apertures, which assemblies replace the take-off barrier, may be used as can be understood by one skilled in the art.

A plurality of catalyst and quench inlets can be used in reactor 101 and one or more pairs of catalyst and quench inlets may be used for each reactor section, 167 to 173. The catalyst and quench inlets are typically designed so that the catalyst and quench liquid are distributed onto the top of the agitated bed at roughly the same location. Such introduction of catalyst and quench liquid combined with slow agitation has been found to provide more uniform polymerization and prevent localized fusion in the polymer bed and hence reduce the number of molten plugs of polymer formed and give more trouble free performance of the reactor. It is advantageous in one mode of carrying out polymerization in the reactor to provide for separately controlled addition of catalyst components and quench liquid into the various sections by means of, for example, valves. Such separately controlled additions into reactor sections 167 to 173 help provide for separate control of polymerization temperatures and polymer production rate among the sections and can be used to vary and control the molecular weight and particle size distribution of the polymer.

The vapor recycle which includes the polymerizable monomer or monomers and hydrogen, if used, is brought in through vapor recycle line 156 to vapor recycle inlets 175 to 181 at a rate designed to prevent fluidization of the bed. The rate at which the vapor recycle gases are introduced into the individual sections 167 to 173 can be controlled by valves 191 to 197 and such control may be used to help vary the section polymerization temperatures and polymer production rates if desired.

In an important embodiment of the process using the reactor described herein in which the polymerization temperature of one or more of the sections is held at a different value than in the other section or sections (dual temperature operation or multi-temperature operation), it is advantageous to vary the concentrations of any or all of the catalyst components being introduced into the various sections. Particle size distribution and molecular weight distribution are advantageously affected thereby. This may be accomplished by feeding the catalyst inlets of the different sections individually. Even in single temperature operation, it can be advantageous to feed one or more of the sections with catalyst components at different concentrations than catalyst components being introduced into the other section or sections.

The overall reactor temperature range for polymerization depends upon the particular monomer which is being polymerized and the commercial product desired therefrom and as such are well known to those skilled in this art. In general, the temperature range used varies between about 40° C up to about the softening temperature of the bed. The total polymerization pressure is composed of the polymerizable monomer pressure, vaporized quench liquid pressure and hydrogen pressure, if used, and such total pressure typically may vary from above about atmospheric to about 600 psig. The individual partial pressures of the components making up the total pressure determine the rate at which polymerization occurs, the molecular weight, and the molecular weight distribution of the polymer to be produced. The temperature of polymerization is controlled as may be understood by one skilled in the art.

False end plates inserted in reactor 101 for mechanical construction purposes are shown as 124 and 126.

Figure 2:
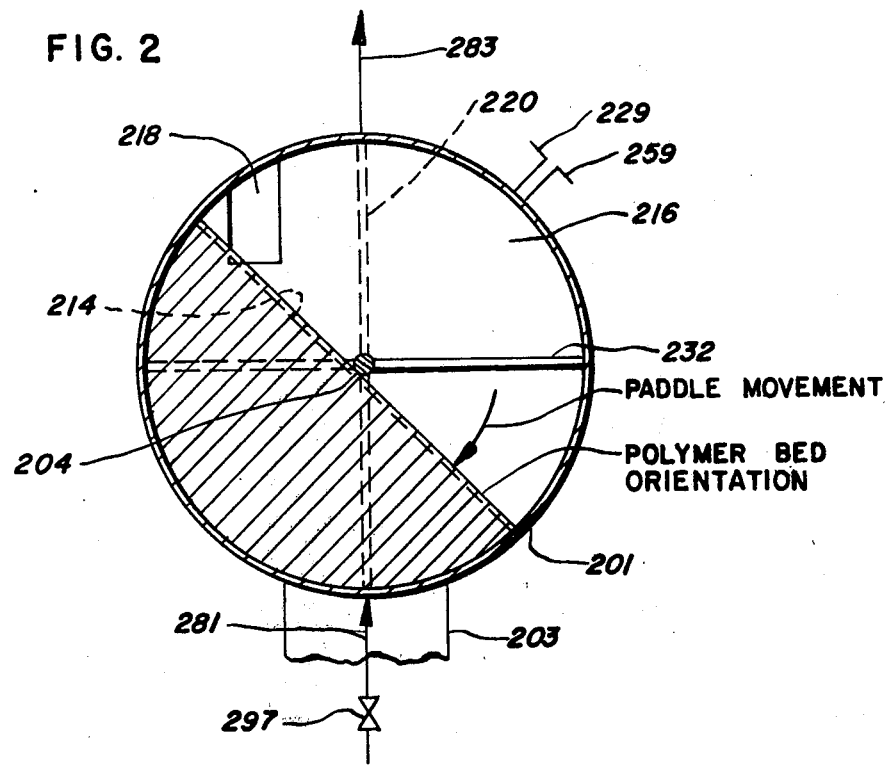
FIG. 2 shows a transverse view of such reactor along line 2—2 of FIG. 1.

In FIG. 2 a view of reactor 101 of FIG. 1 is shown along line 2—2 of FIG. 1. The Figure shows the ninety degree orientation of the paddles on adjacent impellors, the adjustable take-off barrier opening 218 and take-off barrier 216. Further, the Figure shows the orientation of weir 214 and the polymer bed in reactor 201 and the direction of paddle movement with respect to the bed orientation.

Figure 3:
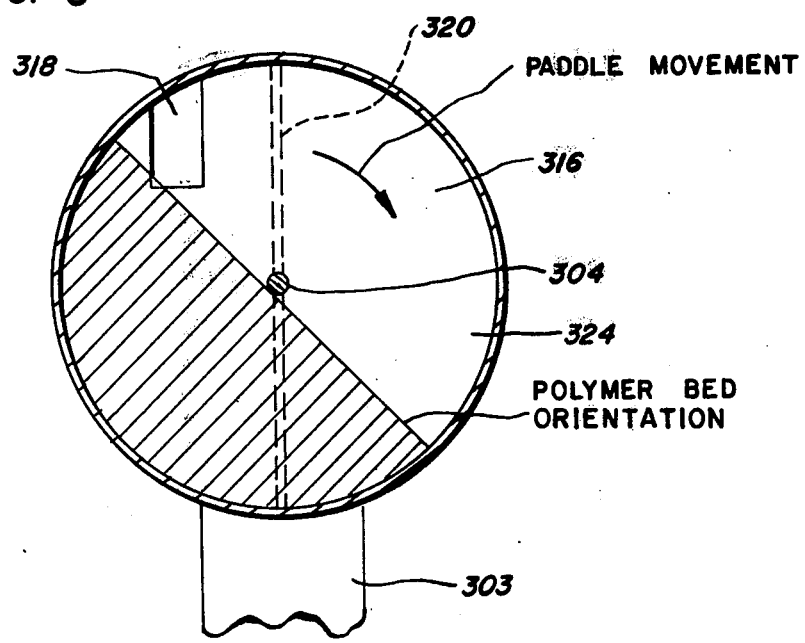
FIG. 3 shows a second transverse view of the reactor of FIG. 1 along line 3—3 of FIG. 1.

FIG. 3 shows a view of reactor 101 of FIG. 1 along line 3—3 of FIG. 1. also shown are take-off barrier 316, its opening 318 and the direction of motion of the paddles with respect to take-off barrier opening 318 and the orientation of the polymer bed.

The apparatus and process described herein may be applied to the polymerization of polymerizable monomers which are polymerizable below the softening point of their polymeric forms including ethene, propene,4-methyl-pentene-1, butene-1, vinyl chloride, butadiene, styrene, PET and mixtures of such monomers. Particularly suitable are the polymerization of ethene and propene.

The quench liquid used for temperature control is a readily volatilizable liquid which can be sprayed onto the surface of the polymer bed to evaporatively conduct heat away from the polymer bed and thus must be inert to the monomer being polymerized, the catalyst components used in the polymerization, and have as high a heat of evaporation as is consistent with ready volatization of the quench liquid in the reactor at the polymerization temperature. In general alkanes such as propane, a butane, a pentane, or a hexane or closely boiling mixtures thereof may be used. The preferred quench liquid for ethene is isobutane or isopentane. It should be understood that where the monomer to be polymerized is readily condensible, e.g. propene, the quench liquid can be liquified monomer or a mixture of liquified monomer and an additional quench liquid.

The rate of quench liquid addition should be low enough to keep the polymer bed dry, i.e. maintain the partial pressure of the quench liquid vapor below the dew point, yet large enough to obtain the maximum cooling effect of the quench liquid. Generally, the quench liquid will carry away fifty percent or more of the heat of polymerization. For propene polymerization over ninety percent of the heat of polymerization is desirably removed by the quench liquid. At a 200° F polymerization temperature in the polymerization of ethene, desirably more than seventy percent of the heat of polymerization is removed using isobutane and more than fifty percent of the heat is removed using isopentane.

In general, the catalysts which are most useful to the process described herein are those which are very active and give a high yield on catalyst. Included in this group are cocatalysts composed of organometallic compounds of Periodic Groups IA, IIA and IIIA and catalysts which are based on transition metal compounds. Aluminum alkyl compound cocatalysts are especially preferred and may be a trialkylaluminum or an alkyl aluminum halide such as a dialkylaluminum chloride. The transition metal catalyst can be a metal compound of Group IV or Group V such as a titanium or vanadium compound, a compound of Group VI such as chromium or molybdenum oxide or may be one of the above catalysts supported on a magnesium-based support or a support such as alumina, silica, or silica-alumina.

The preferred catalysts and cocatalysts are as aforesaid high yield catalysts. By high yield is meant catalysts and cocatalysts the residues of which do not have to be removed from the products of the process.

The preferred catalysts and cocatalysts for ethene polymerization are a trialkylaluminum cocatalyst with a catalyst which is a titanium compound supported on magnesium-based support or chromium oxide supported on alumina, silica or combinations thereof. For propene polymerization it is preferable to use a dialkylaluminum chloride cocatalyst and a catalyst which is an active titanium trichloride. However, the process and apparatus described herein are not meant to be limited to the catalyst and cocatalyst used except in that the apparatus and process operate best using high yield catalysts.

While the invention is described in connection with the specific Examples below, it is to be understood that these are for illustrative purposes only. Many alternatives, modifications, and variations will be apparent to those skilled in the art and such alternatives, modifications and variations fall within the spirit and scope of the appended claims.

EXAMPLE I

A supported titanium chloride catalyst was suspended in isopentane at a concentration of 30 milligrams/liter and pumped continuously to the reactor at a rate of 300 milliliters/hour. Aluminum triethyl diluted with isopentane to 1000 milligrams/liter was pumped continuously at a rate to maintain the desired weight ratio of aluminum triethyl/catalyst, 3/1 to 15/1. Ethylene was charged continuously at the rate of polymerization to maintain pressure, 300 psig. A continuous stream of gas, 0.3 cubic feet/hour, was removed from the reactor for gas chromatographic analysis to maintain the hydrogen concentration in the reactor at 34 mol percent by intermittent hydrogen addition for polymer molecular weight control. The reactor polymer bed temperature was held at 160° F. by continuously spraying isopentane at the appropriate rate onto the 30 R.P.M. stirred polymer bed. The vaporized isopentane was condensed and recycled. The non-condensed gas (40° to 50° F.) was continuously recycled back into the bottom of the stirred polymer bed. The polymer bed level was maintained by the opening position in the retaining weir. The polymer overflow spilled out into the melter which was maintained at 350° to 400° F. by a combination of polymerization heat and external electrical heat. The melted polymer sumped to the bottom and was forced through a horizontal piece of ¾ inch diameter × 4 foot long pipe at 400° to 500° F. by the reactor pressure. Water was injected continuously into the polymer melt between the melter and catalyst deactivator at a rate of 10 milliliters/hour. Polymer melt extruded from the catalyst deactivator through a ⅜ inch diameter opening and is drawn through a water bath and chopped. Polymer was produced at the rate of 1 to 3 pounds/hour at a yield level of 100,000 grams polymer/gram catalyst. Physical properties of the polymer taken out of the melter are shown below in Table I and some properties of the polymer powder taken from the reactor are shown in Table II.

TABLE I

Conditions: 160° F, 300 psig, 34 mol percent $H_2$, 13/1 to 15/1 triethyl aluminum/catalyst weight ratio

| | Run A | Run B[1] |
|---|---|---|
| General Properties | | |
| Unannealed density, grams/cubic centimeter | 0.961 | 0.959 |
| Annealed density, grams/cubic centimeter | 0.977 | 0.977 |
| Inherent viscosity, dl/gram | 1.87 | 2.29 |
| Melt index, $MF_1$, grams/10 minutes | 0.92 | 0.44 |
| Melt index, $MF_{10}$, grams/10 minutes | 38 | 24 |
| Flow rate ratio, $MF_{10}/MF_1$ | 41.4 | 54.5 |
| Hexane extractables, weight percent | 0.47 | 0.41 |
| Oven volatiles content, weight percent | 0.20 | 0.28 |
| Stiffness, psig | 165,000 | 160,000 |
| Molecular Weight Parameters, GPC | | |
| Molecular weight distribution, $\overline{M}_w/\overline{M}_n$ | 7.6 | 10.5 |
| Tensile Properties | | |
| Tensile strength at yield, psig at 2 inches/minute | 4540 | 4600 |
| Tensile strength at ultimate, psig at 2 inches/minutes | 3410 | 2810 |
| Elongation at yield, percent at 2 inches/minute | 10 | 11 |
| Elongation at ultimate, percent at 2 inches/minute | 1200 | 689 |
| Impact Properties | | |
| Tensile impact strength, ft-lb/in$^2$ | 65 | 88 |
| Izod impact strength, ft-lb/in notch | 9.2 | 9.8 |
| Thermal Properties | | |
| Vicat softening point, ° F | 266 | 262 |
| Brittleness temperature, ° C | — | — |

[1]Triethylaluminum/catalyst weight ratio = 2.6/1 to 3.75/1.

TABLE II

Conditions: 160° F, 300 psig, 34 mol percent $H_2$, 13/1 to 14/1 triethylaluminum/catalyst weight ratio

| | RUN A | | | RUN B |
|---|---|---|---|---|
| Cut number | 3R | 8R | 10R | |

TABLE II-continued

Conditions: 160° F, 300 psig, 34 mol percent $H_2$, 13/1 to 14/1 triethylaluminum/catalyst weight ratio

|  | RUN A |  |  | RUN B |
|---|---|---|---|---|
| Total polymer produced, grams | 3628 | 5509 | 6637 | 1952 |
| Inventory turnover (No. of times) | 3.0 | 4.6 | 5.5 | 1.6 |
| Percent original inventory remaining | 5 | 1 | 0.4 | 20 |
| Bulk density, grams/cubic centimeter | 0.36 | 0.37 | 0.37 | 0.41 |
| $MF_{10}$ | 28.7 | 38.7 | 48.2 |  |
| $MF_1$ | 0.89 | 1.0 | 1.3 |  |
| $MF_{10}/MF_1$ | 32.3 | 38.7 | 37.1 |  |

EXAMPLE II

A carbon steel reactor approximately 2 feet in diameter by 3.0 feet in length was used in this continuous ethylene-propylene polymerization. Temperatures were 181° F at one end of the reactor, 171° F at the center of the reactor and 181° F near the take-off barrier end and reactor total pressure was 400 psig. Ethylene was fed to the reactor at 20.57 pounds/hour and propylene was added at 0.29 pounds per hour. The recycle gas rate was 2.29 actual cubic feet per minute and the recycle quench liquid, isopentane, rate was 0.29 gallons/minute. The supported titanium catalyst was added at about 0.3 grams per hour as a dilute slurry in isopentane. The amount of slurry added was about 3 gallons per hour. Triethylaluminum cocatalyst was added as a solution in isopentane at a rate of 35 milliliters per hour at a concentration of 0.025 grams triethylaluminum per milliliter.

Gas analyses of reactor recycle gases were continuously made and typical values were: hydrogen, 37 mol percent; ethane, 0.3 mol percent; propene; 1.1 mol percent; isopentane, 1 mol percent and ethene, 60.6 mol percent.

The melt index of product was about 0.58 grams/10 minutes.

EXAMPLE III

Ethylene was polymerized in the same manner described in EXAMPLE I. The catalyst was 2.0 weight percent chromium trioxide on W. R. Grace 952 $SiO_2$. Catalyst was calcined at 1200° F. with dry oxygen for 12 hours. Catalyst, triisobutylaluminum and ethylene were continuously charged to the reactor at 210° F. under 300 psig. pressure. Hydrogen was charged as needed to maintain 35 mol percent $H_2$ in the reactor. The mole ratio of $Al(i-Bu)_3/CrO_3$ was 3. The polymer yield based on catalyst was 4,600 grams/gram. Polymer was removed continuously as a melt. The polymer produced showed the following physical properties:

TABLE III

| Cut | M.I. | $MF_{10}$ | $MF_{10}/MF_1$ | Wt. % Extractables | Wt. % Volatiles | $\overline{M}w/\overline{M}n$ |
|---|---|---|---|---|---|---|
| 5 | 0.20 | 22.2 | 111 | 1.5 | 0.65 | 14.7 |
| 6 | 0.12 | 16.6 | 138 | 1.6 | 0.87 | 17.0 |
| 7 | 0.12 | 20.2 | 168 | 1.8 | 0.98 | 15.4 |

EXAMPLE IV

Propylene was polymerized by an active titanium chloride catalyst with diethylaluminum chloride cocatalyst continuously in the gas phase under conditions tabulated in Table IV. The propylene served as its own quench liquid for heat removal. Polymer was intermittently removed as particulate through a double ball-valved lock chamber attached to the take-off end of the reactor.

TABLE IV

POLYMERIZATION OF PROPYLENE
Catalyst: Titanium trichloride
Cocatalyst: Diethylaluminum chloride
Conditions: 160° F, 300 psig, 1 mole percent hydrogen

| Time on stream, minutes | 145 | 270 | 153 | 225 | 162 |
|---|---|---|---|---|---|
| Type of catalyst addition | Batch | Batch | Continuous | Batch | Continuous |
| $Et_2AlCl/TiCl_3$ ratio | 2.8 | 2.8 | 3.0 | 2.8 | 2.9 |
| $TiCl_3$ addition rate, milligrams/hour | 48[1] | 24–48[2] | 45 | 24–48[2] | 46 |
| Total polymer produced, grams | 165 | 486 | 296 | 358 | 300 |
| Polymer yield, grams/gram | ( 0–145 min) 1970 | ( 0–270 min) 3120 | (0–153 min) 2600 | ( 0–225 min) 2980 | (0–162 min) 2040 |
|  | ( 0–60 min) 640 | ( 0–60 min) 1225 |  | ( 0–90 min) 172 |  |
|  | (60–145 min) 4600 | ( 60–120 min) 3800 |  | (90–225 min) 7200 |  |
|  |  | (120–180 min) 5300 |  |  |  |
|  |  | (180–240 min) 4700 |  |  |  |
|  |  | (240–270 min) 3000 |  |  |  |

[1] A 12 milligram portion of catalyst added every 15 minutes up to 90 minutes. No catalyst added after 90 minutes.
[2] A 12 milligram portion of catalyst added every 15 minutes up to 90 minutes. A 12 milligram portion of catalyst added every 30 minutes from 90 to 270 minutes.

EXAMPLE V

A supported titanium chloride catalyst and triethylaluminum catalyst were employed in the same manner as described in Example I using approximately 3 mol percent propylene in the reactor gas to copolymerize with the ethylene. Liquid propylene was added continuously at the rate of 30 milliliters/hour which maintained its concentration at 3 mol percent in the reactor gas. Copolymer was removed by way of a double ball-valved lock chamber attached to the take-off end of the reactor as particulate. Catalyst and cocatalyst were deactivated by treating the copolymer with 250° F. steam. A copolymer inhibitor package was added and the product thereof was melt extruded in the normal manner to form product pellets. Conditions of two such runs are shown in Table V below.

TABLE V

| Run period | 1 | 2 | 3 | 4 | 5A | 5B | 6 | 7 | 8 | 9 | 10 | 1 |
|---|---|---|---|---|---|---|---|---|---|---|---|---|
| Time on stream, hours, minutes | 5,12 | 3 | 5,20 | 4,22 | 3,8 | 3,8 | 6,37 | 7,10 | 6,55 | 4,22 | 3,15 | 2,45 |
| Temperature, ° F | 179 | 178 | 179 | 177 | 178 | 178 | 180 | 182 | 186 | 185 | 207 | 207 |
| Total pressure, psig | 300 | 300 | 300 | 300 | 300 | 300 | 300 | 300 | 300 | 300 | 300 | 300 |
| Ave. catalyst, feedrate, milligrams/hour | 37.0 | 29.1 | 30.9 | 33.3 | 40.2 | 40.2 | 42 | 37 | 33.3 | 37.9 | 39.2 | 41.0 |
| *TEA/CAT | 7.5 | 7.5 | 7.5 | 7.5 | 7.5 | 15 | 7.5 | 7.5 | 7.5 | 15 | 15 | 7.5 |
| Recycle gas composition, mol percent |  |  |  |  |  |  |  |  |  |  |  |  |

TABLE V-continued

| | | | | | | | | | | | | |
|---|---|---|---|---|---|---|---|---|---|---|---|---|
| Hydrogen | 38 | 35 | 36 | 31 | 40 | 40 | 42 | 41 | 39 | 36 | 36 | 36 |
| Ethylene | 52 | 44 | 52 | 61 | 48 | 48 | 41 | 46 | 50 | 55 | 52 | 52 |
| Ethane | 6.6 | 20.5 | 7.8 | 4.2 | 8.6 | 8.6 | 12.6 | 8.8 | 7.0 | 5.1 | 8.3 | 8.3 |
| Propylene | 2.3 | 3.2 | 3.2 | 3.2 | 2.6 | 2.6 | 3.1 | 2.9 | 3.4 | 2.9 | 3.2 | 3.2 |
| Isopentane | 1 | 1 | 1 | 1 | 1 | 1 | 1 | 1 | 1 | 1 | 1 | 1 |
| Reactor bleedrate, cubic feet/hour | 0.87 | 0.86 | 0.59 | 0.61 | 0.69 | 0.69 | 0.63 | 0.64 | 0.63 | 0.62 | 0.59 | 0.59 |
| Polymer produced, grams | 500 | 690 | 822 | 1357 | 0 | 165 | 339 | 1416 | 1015 | 1764 | 754 | 348 |
| Catalyst yield, gram/grams | 2600 | 8000 | 4980 | 9320 | 0 | 620 | 1150 | 5345 | 4410 | 10,660 | 5915 | 3130 |
| Melt index, grams/10 minutes | 0.17 | 0.2 | 0.2 | 0.17–1.0 | — | — | 6–7 | 6–7 | 6–7 | 6–7 | 6–7 | 6–7 |

| | | |
|---|---|---|
| Run period | 1 | 2 |
| Time on stream, hours, minutes | 4,53 | 5,15 |
| Temperature, °F | 193 | 200 |
| Total pressure, psig | 300 | 300 |
| Ave. cat. feedrate, milligrams/hour | 40 | 28 |
| TEA/CAT* | 7.5 | 7.5 |
| Recycle gas comp., mol percent | | |
| Hydrogen | 44 | 42 |
| Ethylene | 45 | 46 |
| Ethane | 7.0 | 8.0 |
| Propylene | 2.9 | 2.95 |
| Isopentane | 1 | 1 |
| Reactor bleedrate, cubic feet/hour | 0.62 | 0.67 |
| Polymer produced, grams | 1055 | 1539 |
| Catalyst yield, grams/grams | 5375 | 8800 |
| Melt index, grams/10 minutes | 12–20 | 17–19 |

*TEA/CAT is the weight ratio of triethylaluminum to catalyst used.

EXAMPLE VI

A supported titanium chloride catalyst and triethylaluminum cocatalyst were employed for the polymerization of ethene in the same manner as Example I. Polymer was removed by way of a double ball-valved lock chamber as particulate. Catalyst was deactivated by treating with steam at 250° F. Polymer inhibitor package was added and the result thereof was melt extruded in the normal manner to form product pellets. Polymerization product conditions and properties of some of the various cuts are shown in Tables VI and VII.

TABLE VI

| Polymerization Conds. | | | | | | | | | | | | |
|---|---|---|---|---|---|---|---|---|---|---|---|---|
| Temp., Zone 1° F | 180 | 160–205 | 160–205 | 160–205 | 160–205 | 205 | 190 | 195 | 195 | 185 | 190 | 190 |
| Zone 2° F | 175 | 160–205 | 160–205 | 160–205 | 160–205 | 205 | 189 | 192 | 190 | 182 | 186 | 190 |
| Exit port °F | 165 | 170 | 170 | 170 | 170 | 170 | 173 | 175 | 172 | 170 | 174 | 170 |
| Solv. res. | 137 | 150 | 150 | 145 | 150 | 150 | 152 | 152 | 152 | 152 | 156 | 140 |
| Pressure, psig | 300 | 300 | 300 | 300 | 300 | 300 | 300 | 300 | 300 | 300 | 300 | 300 |
| Reaction gas comp., mol % | | | | | | | | | | | | |
| Hydrogen | 25 | 22 | 22 | 20 | 25 | 25 | 60 | 35 | 42 | 40 | 44 | 55 |
| Ethylene | 74 | 77 | 77 | 79 | 73 | 72 | 39 | 64 | 56 | 59 | 55 | 41 |
| Ethane | 0.2 | 0.3 | 0.3 | 0.2 | 0.4 | 0.9 | 0.3 | 0.6 | 0.6 | 0.4 | 3.0 | 0.4 |
| Isopentane | 1 | 1 | 1 | 1 | | | | | | | | |
| Ract. vent rate, ft.$^3$/hr. | 0.67 | 0.67 | 0.67 | 1.92 | 1.05 | 0.20 | 0.65 | 0.72 | 0.77 | 0.75 | 0.80 | 0.72 |
| Catalyst | | | | | | | | | | | | |
| Feeder conc., mg./l. | 125 | 125 | 62.5 | 62.5 | 62.5 | 62.5 | 62.5 | 125 | 80 | 62.5 | 31,2 | 40 |
| Feed rate, mg./hr. | 31.9 | 25.2 | 10.6 | 8.7 | 11.9 | 4.85 | 21.8 | 17.2 | 9.1 | 2.9 | 11.6 | 11.0 |
| Cocatalyst | | | | | | | | | | | | |
| AlEt$_3$ feeder conc., mg./l. | 1,250 | 1,250 | 625 | 625 | 625 | 625 | 625 | 1,250 | 800 | 625 | 313 | 200 |
| AlEt$_3$ feed rate, mg./hr. | 319 | 252 | 106 | 87 | 119 | 485 | 218 | 172 | 91 | 29 | 116 | 55 |
| AlEt$_3$/cat. (g./g.) | 10 | 10 | 10 | 10 | 10 | 10 | 10 | 10 | 10 | 10 | 7.5 | 5 |
| Polymerization Results | | | | | | | | | | | | |
| Total run time, hrs. | 9.8 | 14.8 | 1.8 | 6.2 | 7.5 | 7.8 | 20.9 | 7.5 | 2.5 | 5.8 | 6.5 | 22.9 |
| Total polymer, g. | 663 | 2,107 | 781 | 619 | 1,146 | 749 | 52 | 366 | 429 | 3,335 | 2.05 | 3,077 |
| Polymer yield on cat., g./g. | 2,000 | 5,660 | 41,700 | 11,600 | 12,800 | 19,700 | — | 2,830 | 19,240 | 204,000 | 2,715 | 12,200 |

TABLE VII

| | Cuts 13–22 | Cuts 23–39 |
|---|---|---|
| General Properties | | |
| Annealed density, g/cc | 0.9734 | 0.9787 |
| Inherent viscosity, dl/g | 1.99 | 1.28 |
| Melt index, MF$_1$, g/10 min | 1.1 | 7.3 |
| Melt index, MF$_{10}$, g/10 min | 35 | 234 |
| Flow rate ratio, MF$_{10}$/MF$_1$ | 32 | 32 |
| Hexane extractables, wt % | 0.30 | 0.70 |
| Oven volatiles content, wt % | 0.04 | 0.33 |
| Stiffness, psig | 137,000 | 179,000 |
| Tensile Properties | | |
| Tensile strength at yield, psig at 2 in/min | 4,520 | — |
| Tensile strength at ultimate, psig at 2 in/min | 2,940 | 4,850 |
| Elongation at yield, % at 2 in/min | 11 | — |
| Elongation at ultimate, % at 2 in/min | 1,100 | 9.9 |
| Impact Properties | | |
| Tensile impact strength, ft-lb/in$^2$ | 82 | 22 |
| Izod impact strength, ft-lb/in$^2$ | 9.7 | 0.55 |
| Thermal Properties | | |
| Vicat softening point, °F | 263 | 259 |

EXAMPLE VII

Propylene was polymerized in essentially the same manner described in EXAMPLE I. The recycle gas and quench liquid were propylene. The melter temperature was 350° F. while the catalyst kill section operated at 400° F. An active titanium chloride catalyst (33 milligrams) with diethylaluminum chloride cocatalyst (77 milligrams), mol ratio Al/Ti - 3, was charged to the reactor every thirty minutes. Hydrogen was added as needed to maintain 2.9 mol percent in the reactor gas cap. The reactor temperature was maintained at 160° F. and the reactor pressure was controlled at 300 psig by controlling temperature in the recycle condenser at about 120° F. A polymer yield based on catalyst of 10,000 grams/gram was obtained. The polymer was removed from the reactor as a melt. The polymer showed a melt flow rate of 16.4 grams/10 minutes at 230° C. under a load of 2,060g. The 68° C. n-hexane extractables was 4.0 weight percent.

EXAMPLE VIII

Ethylene was polymerized in the same manner described in EXAMPLE I except in this case two sections of the reactor were maintained at different temperatures. Reactor section one was operated at 160° F. while reactor section two was operated at 210° to 230° F. This was accomplished by varying the amount of isopentane quench added to each section. The catalyst used was a supported titanium compound and an aluminum triethyl cocatalyst was added in a weight ratio of cocatalyst to catalyst of three to one. The reactor pressure was controlled at 300 psig. and the hydrogen concentration was maintained at 40 mol percent. A polymer yield of 62,000 grams of polymer/gram of catalyst was obtained. The polymer melt index was measured at 5.5 with a $MF_{10}/MF_1$ of about 40 and a spiral flow of 18 inches. Polymer having the same M.I. made under single temperature conditions showed an $MF_{10}/MF_1$ value of about 34 and demonstrated a spiral flow of about 16 inches.

Spiral flow is an empirical method of assessing ease of processability of a polymer by measuring the length of flow in a special mold under specific temperature and pressure conditions. The longer the spiral flow the easier is the processability.

What is claimed is:

1. A continuous process for the vapor phase polymerization of at least one polymerizable monomer in a stirred, horizontal, reactor containing a subfluidized particulate polymer bed wherein at least a portion of the heat of polymerization is removed by evaporative cooling using an inert readily volatilizable liquid, said reactor being divided into two or more individually polymerization-temperature-controllable polymerization sections by one or more barriers so constructed to allow free gas mixing within said reactor and to control movement of said particulate between said sections.

2. The process of claim 1 wherein said monomer is at least ethene.

3. The process of claim 2 wherein said liquid is propane, a butane, a pentane, a hexane or a closely boiling mixture thereof.

4. The process of claim 2 wherein said liquid is isobutane or isopentane.

5. The process of claim 1 wherein said monomer is at least propene.

6. The process of claim 5 wherein said liquid is propene, propane, a butane, a pentane, a hexane or a closely boiling mixture thereof.

7. The process of claim 5 wherein said liquid is propene.

8. The process of claim 1 wherein said monomer is at least butene-1.

9. The process of claim 1 wherein said monomer is at least 4-methyl-pentene-1.

10. The process of claim 1 wherein said monomer is at least butadiene.

11. The process of claim 1 wherein said monomer is at least styrene.

12. The process of claim 1 wherein said monomer is at least vinyl chloride.

* * * * *